Patented Sept. 13, 1932

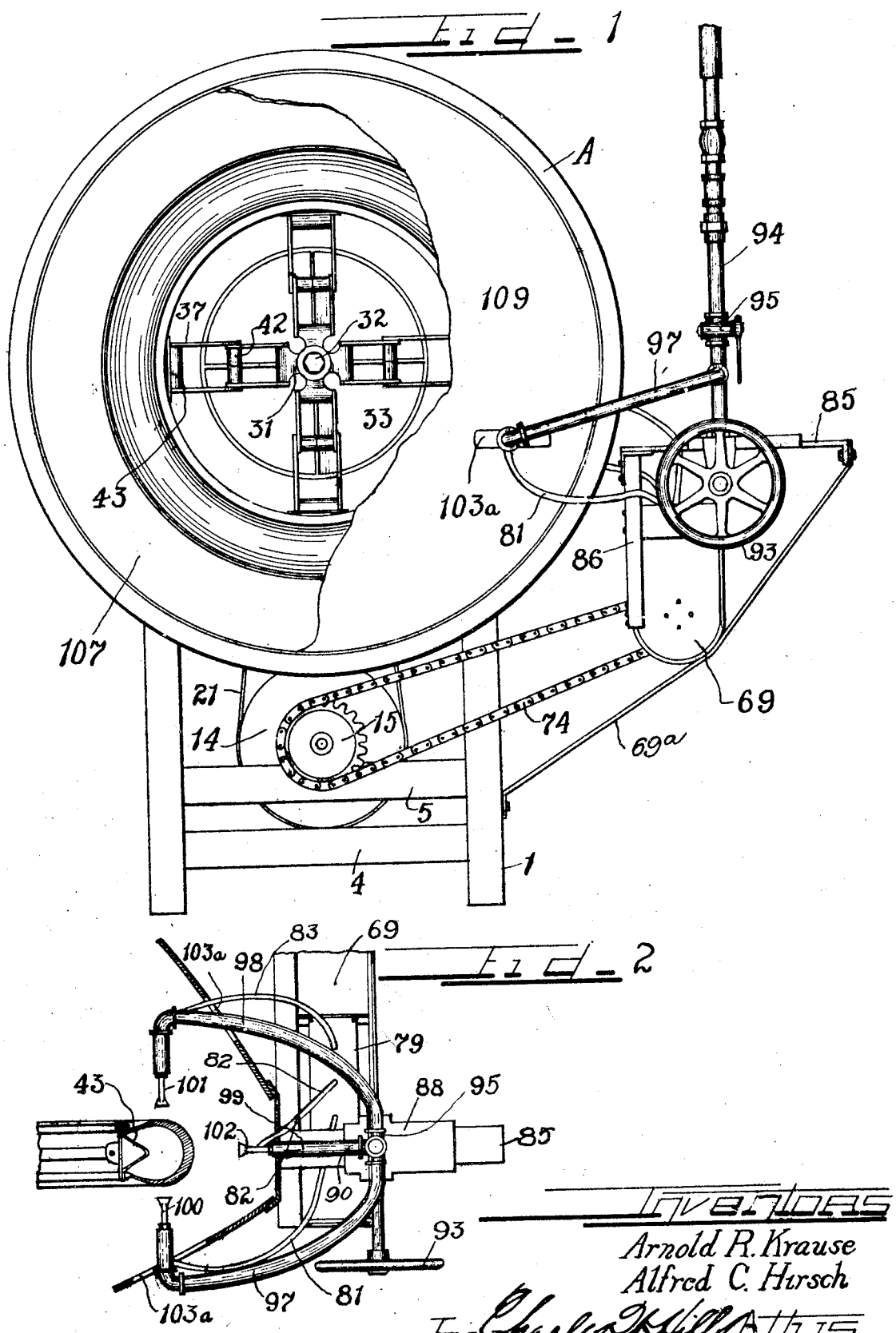

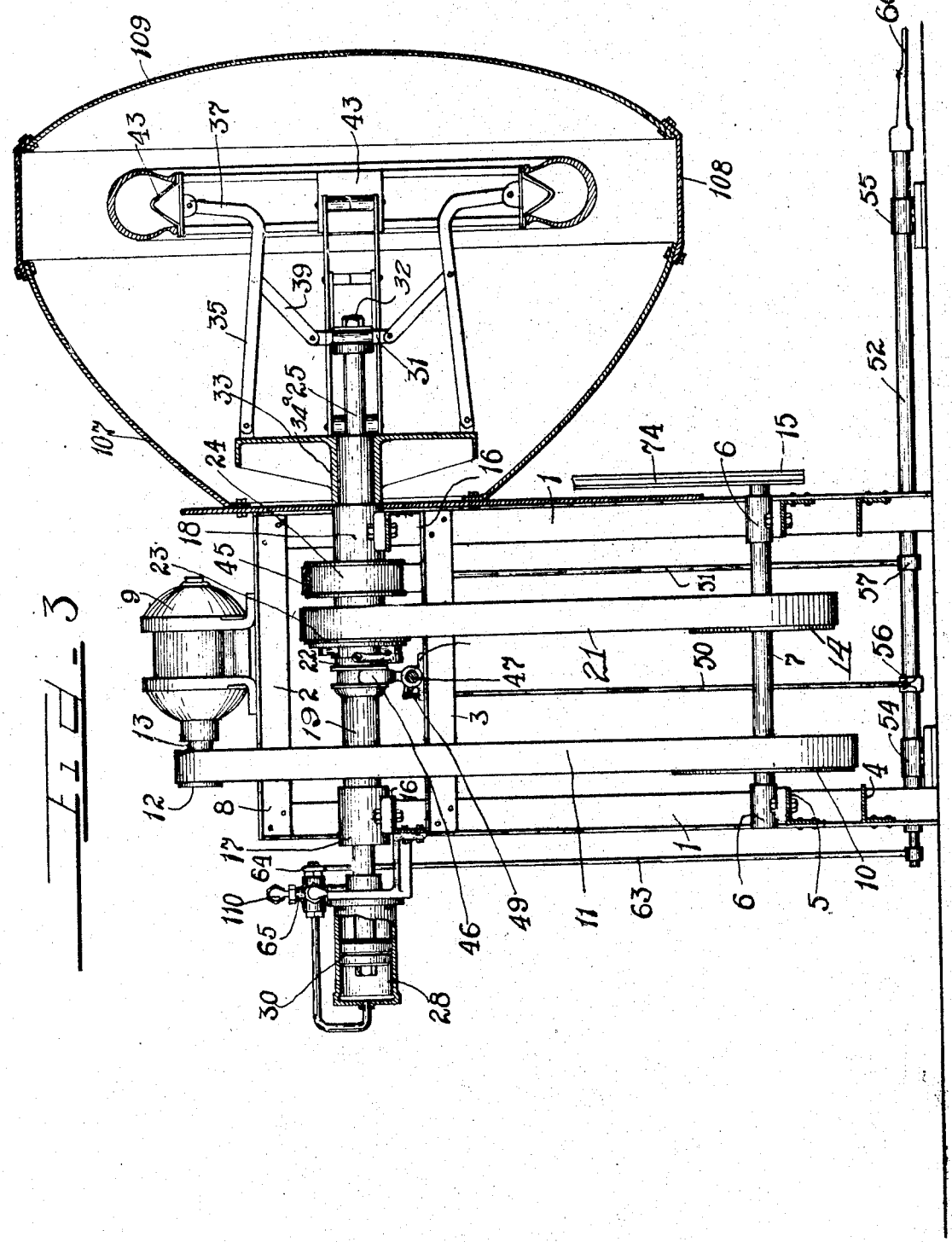

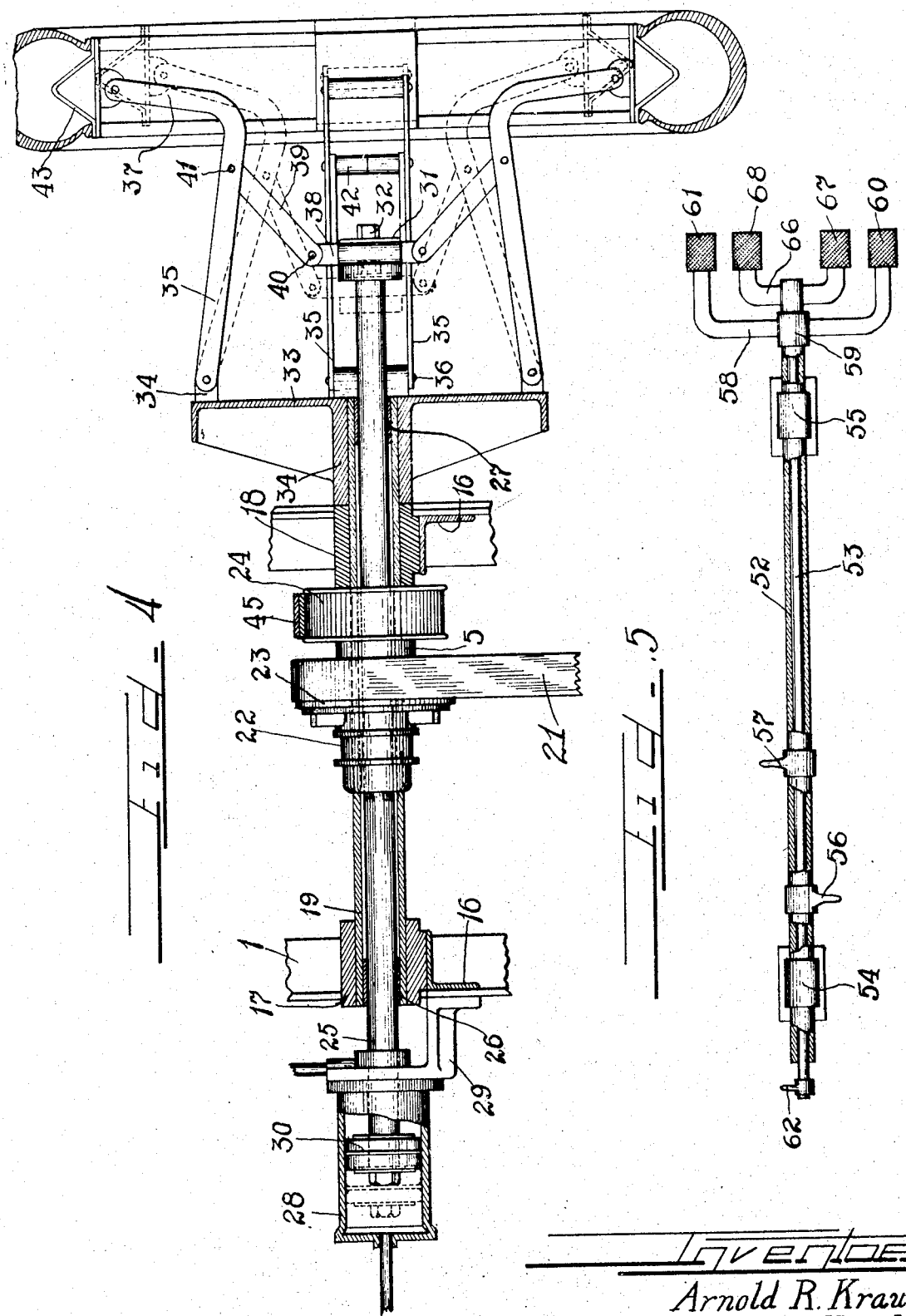

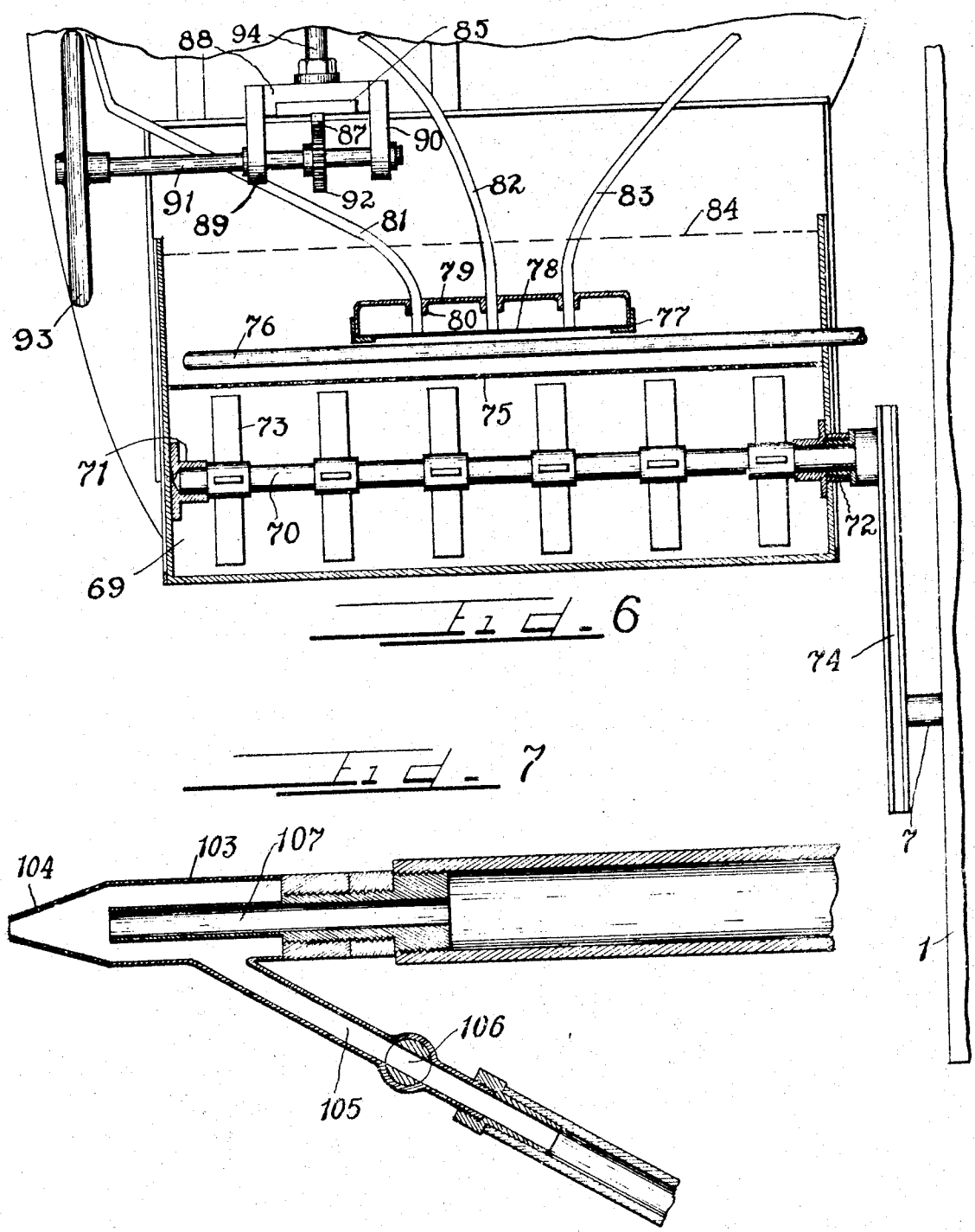

1,876,967

UNITED STATES PATENT OFFICE

ARNOLD R. KRAUSE AND ALFRED C. HIRSCH, OF EAU CLAIRE, WISCONSIN, ASSIGNORS TO GILLETTE RUBBER COMPANY, OF EAU CLAIRE, WISCONSIN, A CORPORATION OF WISCONSIN

MACHINE FOR PAINTING TIRES AND THE LIKE

Application filed May 8, 1929. Serial No. 361,280.

This invention relates to a machine for painting tires and the like and is particularly directed to a machine in which an article such as a tire or the like is rotated and while so rotating is sprayed or otherwise painted.

Tires are painted by hand at the present time.

This invention has for its main object the provision of a machine for painting tires or like articles.

An object of the invention is to provide a machine wherein a tire or like article may be quickly clamped, painted, and removed.

Another object of the invention is to provide a machine for painting tires or the like which is rapid in operation and one in which a tire or similar article may be quickly secured, painted and removed, together with means for accomplishing clamping and painting of the tire operated from a single power source and controlled in a ready and efficient manner.

A still further object of the invention is to provide a machine for painting tires or the like which is efficient in operation, economical to manufacture and expeditious in use.

The above, other and further objects of the invention will be apparent from the following description, accompanying drawings and appended claims.

The apparatus chosen to exemplify this invention is illustrated in the accompanying drawings and the views thereof are as follows:

Figure 1 is a side elevational view of a machine constructed to embody this invention.

Figure 2 is a top plan view of a fragmental portion of the machine illustrated in Figure 1 and of the right hand side of said machine as illustrated.

Figure 3 is a side elevational view of the exemplified machine with certain parts in section.

Figure 4 is an enlarged fragmental portion parts of which are in section of the operating parts of the exemplified machine.

Figure 5 is a top plan view partially in section of a treadle arrangement utilized in the exemplified machine.

Figure 6 is an enlarged fragmental view with parts in section of the paint tank and associated mechanisms.

Figure 7 is an enlarged axial section through one form of nozzle which may be employed with the machine of this invention.

The frame consists of corner upright members 1 preferably of angle iron with top cross members 2 and intermediate cross members 3, the several members being bolted or riveted together to provide a rigid structure.

There are lower cross members 4 and 5 fastened to the uprights 1. The opposite lower cross members 5 are provided with bearing blocks 6 in which a shaft 7 is journalled.

A platform 8 is fastened to the upper cross members 2 and supports a motor 9.

The pulley 10 is keyed to the shaft 7 and is connected by a belt 11 with the pulley 12 on the motor shaft 13.

Another pulley 14 is keyed or otherwise secured to shaft 7. A sprocket wheel 15 is fastened to shaft 7 preferably outwardly of the frame members.

Side frame members 16 of angle iron are arranged in parallel relation to the side members 4 and 5 adjacent the intermediate cross members 3. A bearing 17 is supported on one of the side frame members 16 and a bearing 18 is supported on the other opposite frame member 16.

A hollow shaft or sleeve 19 is supported in the bearings 17 and 18.

A sliding clutch member 22 is splined on the hollow shaft 19 and is moved into and out of engagement with the clutch pulley 23 to connect or disconnect the same from the hollow shaft 19.

A clutch collar or pulley 23, brake wheel 24 and hub 25 are supported on the hollow shaft 19 for relative rotation with the same. The clutch member 22 is arranged to be moved into and out of clutching engagement with the collar 23 for driving the sleeve 19 and its connected parts. The brake wheel 24 is keyed to the sleeve 19. A belt 21 connects pulleys 14 and 23.

A piston rod 25 extends through the hollow shaft 19 and projects beyond each end thereof being supported within said hollow shaft 19 by bushings 26 and 27.

A cylinder 28 is supported on a bracket 29 secured to the frame structure of the machine. One end of the piston rod 25 enters said cylinder and has a piston head 30 fastened to the end of the rod within the cylinder 28.

A spider 31 is fastened to the opposite end of the piston rod 25 by a nut 32.

A tire arm head 33 is provided with a hub 34a which is secured in any suitable manner to the hollow shaft 19 for rotation with the shaft. The head 33 is provided at intervals in its periphery with apertured lugs 34 to each of which are attached a pair of tire arms 35 by a pin 36.

The arms 35 are elbow shaped having the outer ends 37 thereof directed outwardly.

The spider 31 is provided with apertured ears 38, there being as many apertured ears 38 on the spider as there are apertured lugs 34 on the head. A pair of links 39 are associated with each of the apertured ears 38 of the spider being fastened thereto by pivot pins 40 with the other ends of said links connected by pins 41 to the arms 35 intermediate the ends of the same. Spacers 42 are inserted between the inner surfaces of the links 39 of every pair on the pins 41. Preferably the pins 41 are arranged inwardly of the elbow portion of the arm 35 although the pin connection may be arranged anywhere as desired.

A tire saddle 43 is supported in the outturned ends of every pair of arms 35. The tire saddles are used when tires are to be painted and may be replaced by other appropriate supporting members when articles other than tires are to be painted.

The tire saddles are arranged in removable association with the outturned ends 37 of the arms 35 and may of course be of any desired shape to accommodate the articles being painted.

The piston rod 25 is reciprocated by fluid admitted to the cylinder 28 as will be hereinafter more fully described and said reciprocation causes movement of the arms 35 outwardly into clamping engagement when the piston rod is moved in one direction that is to the right as observed in Figure 4 and withdraws the arms 35 from clamping engagement when moved in the opposite direction.

Figure 4 shows in full lines the position of the arms when clamping a tire in painting position and in dotted lines movement of the arms to a release position whereby the tire may be removed or applied. The extent of movement of the piston rod 25 is controlled by suitable valve connections with the cylinder 28 as will be more fully explained.

The brake wheel or drum 24 is in the present instance provided with a brake band 45 one end of which may be secured to the frame and the other end of which is connected in suitable manner so as to be tightened against the drum 24 for braking purposes.

Referring to Figure 3 of the drawings it will be observed that the clutch member 22 is actuated by a fork 46 on a rock shaft 47 supported in suitable bearings 48 on cross members 3. An arm 49 is fastened to the shaft 47 and is connected to a pull rod 50 which extends downwardly. Another pull rod 51 is connected at its upper end to the brake band 45 and extends downwardly.

A treadle consisting of a hollow shaft 52 and an inner concentric shaft 53 is supported in bearings 54 and 55 on the floor. The hollow shaft 52 is provided with a projection 56 which is connected to the pull rod 50 while another projection extending in the opposite direction from the projection 56 is secured to the pull rod 51. The hollow shaft 52 is rocked or oscillated in order to cause movement of the pull rods 50 and 51 by the projections 56 and 57 respectively. A double treadle consisting of a U shaped member 58 has a hub 59 which is fastened to the hollow shaft 52. The ends of the members 58 are provided with treadle plates 60 and 61 respectively for oscillating the shaft 52. The inner shaft 53 has at one end a projection 62 which is connected to a pull rod 63 the upper end of which is connected to an arm 64 on a valve 65 regulating admission and discharge to and from the cylinder 28. The other end of the shaft 53 is provided with a U shaped treadle 66 having foot plates 67 and 68 for oscillating said shaft to actuate the valve 65.

A paint tank 69 is supported by frame members 69a adjacent the periphery of the casing A which encloses the tire and the clamping mechanism.

The tank 69 has preferably a semi-cylindrical bottom and has a shaft 70 supported in bearings 71, 72 in the ends of the tank extending the length of the tank. Shaft 70 is provided with a series of paddles or agitators 73 for agitating the paint within the tank to keep the same properly liquid and to prevent settling of the pigments. The shaft 70 has one end extending through the bearings 72 outwardly of the end of the tank where it is provided with a sprocket wheel which is connected by means of a sprocket 74 to the sprocket wheel 15 on the shaft 7 so that when the machine is set in motion the agitator shaft 70 and its paddles 73 will rotate.

A screen 75 is arranged within the tank 69 above the paddles 73 while a heating coil 76 is arranged in the tank preferably above the screen 75. Heating coil 76 is supplied from a source not shown of suitable heat such as steam for aiding in keeping the paint in liquid condition.

Intermediate angle members 77 extending transversely of the tank 69 support a second screen 78 and a cover member 79 above the first mentioned screen 75. The cover 79 is provided with apertures 80 through which flexible conduits 81, 82, and 83 pass for receiving paint from the tank 69.

The paint within the tank 69 is maintained at a height indicated by the line 84 and therefore is withdrawn from the tank by suction created in a manner to be hereinafter explained.

A plate 85 is supported above the top of the tank 69 on frame members 86 and 69a and extends transversely of the tank. A rack bar 87 is secured to the underside of the plate 85. A saddle 88 having downwardly extending spaced sides 89 and 90 rides along the plate 85. A hand wheel shaft 91 is supported in the side members 89 and 90 of the saddle 88 and carries a pinion 92 in mesh with the rack bar 87. A hand wheel 93 is arranged at the outer end of the shaft 91 and when the hand wheel is turned in either direction the pinion in mesh with the rack bar 87 will cause movement of the saddle 88 inwardly or outwardly according to the direction of rotation of the hand wheel 93.

A pipe 94 is supported on and movable with the saddle 88 and extends upwardly from the same where it is connected at its upper end to a source of fluid under pressure such as air or steam. A valve 95 is arranged in the pipe 94 for controlling passage of the fluid under pressure.

A T 96 is connected in the pipe 94 below the valve 95 from which T leads three branch pipes 97, 98, and 99. The pipes 97, 98, and 99 are provided at the ends of the same with nozzles 100, 101, and 102 respectively.

The casing A is slotted on each side at 103a and the nozzles 100 and 101 pass laterally inwardly through these slots. The nozzle 102 passes through a slot not shown in the peripheral portion of the casing. The nozzles 100 and 101 are arranged to direct paint against the sides of the tire or other article being painted whereas the nozzle 102 is arranged to direct paint against the peripheral portions of the tire or like article.

The inward and outward position of the nozzles is regulated by the adjustment of the saddle 88 by means of the hand wheel 93 as of course the machine is arranged to receive tires of small as well as large diameter and therefore it is necessary to adjustably arrange the nozzles to properly paint tires of various diameters and sizes.

The nozzles preferably employed with this invention are shown in sectional form in Figure 7 and consist of a barrel 103 having a restricted discharge end 104 which is flattened horizontally as shown in Figure 2 with a lateral inlet 105 in which is arranged a valve 106. The lateral inlet 105 is connected to a hose or other flexible conduit from the paint tank 69 and the barrel 103 is connected to one of the pipes leading from the pressure supply pipe 94. A restricted pipe 107 extends into the barrel 103 beyond the opening of the lateral member 105 so that as the fluid under pressure is discharged into the restricted end 104 of the barrel suction will be created thus drawing the paint from the tank through the hoses into the lateral portion 105 and mixing it with the fluid under pressure for discharge in the form of spray against the tire. The amount of paint may be regulated by means of the valve 106 and also the amount of pressure may be regulated by the valve 95.

The casing A is illustrated as comprising a rearward conical portion 107, a peripheral portion 108 and a front portion 109. The front portion 109 may be made to completely cover the open side of the casing in which event it is made so as to be easily removed and applied for application of a tire to the clamping means of the machine. The casing portion 109 however might be made as shown in Figure 1 which is fixed to the peripheral portion 108 and is cut away for large part of the periphery overlying the zone of application of the paint to the tire. Such an arrangement enables quick application and removal of the tire from the clamp without having to open and close the casing. However, this is a matter of choice as the portion 109 may as before stated comprise a complete closure or a partial closure as illustrated.

The cylinder 28 is actuated in any desired manner preferably by air pressure which air pressure is supplied from a source not shown to the inlet 110 of the valve 65 and by operation of said valve is delivered alternately to the inner ends of the cylinder for actuation of the piston 30. The valve 65 is a four way valve having an atmospheric outlet to allow discharge of the air on the opposite side of the piston from that against which the air under pressure is applied.

The operation of the machine is as follows:

The treadles are actuated so that the clutch 22 is out of engagement with the driving pulley 23 and the treadle controlling the shaft 53 is actuated to admit air to the end of the cylinder 28 to retract or release the clamping arms into the position shown in dotted lines in Figure 4 whereupon a tire is then applied to the saddles 43 and the treadles 68 are operated to advance the piston rod to the right as shown in Figures 1 and 3 thus clamping the tire on the tire arms 35.

The foot plate 61 is then depressed to oscillate the outer shaft 52 to move the clutch 22 into engagement with the driving pulley 23 whereupon rotation is imparted to the hollow sleeve 19. Such rotation is imparted to the head 34 and through the arms 35 and links 39 to the piston rod 25 which rotates as long as the tire is rotated by the clamping means. The piston 30 rotates within the cylinder 28 during such movement. During the time the tire is rotating the valves 95 and 106 may be adjusted to spray a proper amount of paint against the tire through the nozzles as illustrated in Figure 2, the tire in the meantime rotating thereby receiving an even deposit of paint on the same. Operation of the machine is continued in this manner until the tire is properly painted whereupon the plate 60 is depressed thus moving the clutch 22 from engagement with the driving pulley 23 and at the same time the pull rod 51 is moved to tighten the brake band 45 against the brake drum 24 to brake or stop rotation of the hollow shaft 19 and its connected parts. The treadle 67 is then actuated to move the piston rod 25 inwardly so as to release the tire whereupon the same is removed and another tire applied for repetition of the painting process just described.

The paddles or agitators in the paint tank 69 are in motion as long as the motor 9 is in operation. Agitation of the paint together with the supply of heat to the paint tank keeps the paint in a sufficiently fluid state so as to respond promptly to suction created in the nozzles responsive to the fluid pressure passing through the nozzles from the pipe 94.

The amount of movement of the piston 30 and its piston rod 25 is of course governed by the diameter of the tire or other article to be painted and may be adjusted by angular arrangement of the projection member 62 on the shaft 53 or in any other suitable manner.

It will be observed that the machine of this invention is simple and expeditious in operation. The various parts of the machine are driven by a single motor and controlled by the treadles in the manner before explained so that one operator may paint tires rapidly and uniformly.

The tires when removed from the clamping means may be suspended and dried in the air or in any other desirable manner.

It will also be observed that the machine is arranged very compactly and that the concentric arrangement of the piston rod and hollow driving shaft 19 lends to reduction in floor space as well as compactness of arrangement and also reduces cost of manufacture.

There have been three nozzles illustrated for painting the tire, of course three nozzles are used merely for the purpose of exemplification of the invention as it is within the contemplation of the invention to use as many or as few nozzles as expediency requires and arranged in a manner to secure the most satisfactory results in the shortest time possible for painting a tire in satisfactory and workmanlike manner.

The invention has been described herein more or less precisely yet it is to be understood that changes may be made in the arrangement and proportions of parts and that equivalents may be substituted without departing from the spirit and scope of the invention.

The invention is claimed as follows:

1. In a machine for spraying a rotatable ring-like member with a fluid, means for rotating said member, clamping means for engaging the inner periphery of said member to connect it with said rotating means, a plurality of nozzles spaced about the outer periphery of said member for spraying the same with a fluid as said member is rotated past said nozzles, a common mounting for said nozzles, and means for adjusting said mounting towards and away from said rotating member in accordance with the diameter of the same, said last mentioned means including a stationary rack and a saddle plate supporting a pinion engaging said rack whereby said saddle plate may be moved as said pinion is rotated along said rack.

2. A tire painting machine including in combination, releasable means for supporting a tire in painting position, means for rotating said tire, a plurality of nozzles for projecting fluid against said tire as the same is rotated, and means for bodily moving said nozzles with respect to a tire during painting, said last mentioned means including a stationary rack and a saddle plate supporting a pinion engaging said rack whereby said plate may be moved as said pinion is rotated along said rack.

3. A machine for painting tires and the like comprising a casing, means for rotatably supporting a tire or like member within said casing, means for rotating said supported member, a plurality of nozzles projecting through said casing and towards said member, a saddle plate supporting said nozzles and means for moving said plate to vary the position of said nozzles with respect to the rotating member, said last mentioned means consisting of a stationary rack bar, a shaft through the sides of the saddle plate, a pinion on said shaft in mesh with said rack bar and a hand wheel to rotate said shaft.

4. A machine for painting tires and the like comprising a casing, a rotating clamp support for a tire within said casing, a paint tank, a plurality of nozzles projecting into said casing and connected with said tank, said nozzles having connections for supplying fluid under pressure thereto, means for agitating the paint in said tank, a heating coil in said tank, means for rotating said clamp support, and means for connecting and disconnecting said clamp support rotating means and said paint agitating means.

5. A machine for painting tires and the like comprising a rotating clamping support, means for rotating said support, means for moving said clamping means into and out of clamping position, a paint tank, nozzles in communication with said tank and arranged to directly discharge against a member supported by said clamp, a stirrer in said tank, said clamp rotating means and said stirrer being connected for simultaneous operation, and means for disconnecting said clamp rotating means from said stirrer.

6. A machine for painting tires or the like including in combination, a frame, a hollow shaft supported in said frame and carrying a head at one end, an axially movable rod passing through said hollow shaft, a plurality of clamping arms pivoted to said head, links connected to one end of said rod and having the other ends of the links connected to intermediate portions of said arms, a fluid pressure cylinder disposed about the other end of said rod, a piston on said rod within said cylinder, means associated with said cylinder for moving said rod axially, driving means on said hollow shaft, means for connecting and disconnecting said driving means with said hollow shaft, said arms being provided with end pieces for engaging a tire, said rod movable in one direction to spread said arms for clamping the tire thereon and when moved in the other direction releasing said tire, said rod being rotatable within said cylinder without affecting its axial movement.

7. In a machine for painting a tire, means for clamping the tire, means for rotating said clamping means, a paint tank, a stationary rack on said paint tank, a saddle plate supporting a pinion engaging said rack whereby said saddle plate may be moved as said pinion is rotated along said rack, and a plurality of nozzles mounted on said saddle plate and disposed about the periphery of said tire.

8. A machine for painting tires and the like comprising a casing, means for rotatably supporting a tire or like member within said casing, means for rotating said supported member, a plurality of nozzles projecting through said casing and toward said member, connections associated with said nozzles for supplying a coloring fluid and a pressure fluid to the same, a saddle plate supporting said nozzles and means for moving said plate to vary the position of said nozzles with respect to the rotating member, said last mentioned means consisting of a stationary rack bar, a shaft through the sides of the saddle plate, a pinion on said shaft in mesh with said rack bar and a hand wheel to rotate said shaft.

9. In a machine for painting tires or the like, means for rotating said tires, a paint tank, nozzles spaced about the periphery of said tires, a common mounting for said nozzles on said tank, means for adjusting said mounting for said nozzles toward or away from said rotating means in accordance with the diameter of the tire, a stirrer in said paint tank and means for connecting said stirrer with said tire rotating means.

10. A tire painting machine comprising in combination a casing, means for rotatably supporting a tire or like member within said casing, means for rotating said supported member, a paint tank adjacent said casing, a plurality of adjustable nozzles mounted on said paint tank and projecting through said casing toward said member, connections between said nozzles and said tank, and pressure fluid means associated with said nozzles for creating suction therein.

11. In a machine for painting a ring-like member provided with beads on its inner periphery such as a tire, a rotary head for connection to the inner periphery of the ring like member and provided with means to engage the beads of the member and to support and rotate the same, a casing defining a painting zone and formed to enable said ring member to be rotated through the painting zone and means at said zone for applying paint to the outer surface of the ring member as the said member is rotated through said zone.

12. In a machine for painting a ring-like member provided with beads on its inner periphery such as a tire, a rotary head for connection to the inner periphery of the ring like member and provided with means to engage the member between the beads to maintain the member distended and to support and rotate the same, a casing defining a painting zone and formed to enable said ring member to be rotated through the painting zone and means at said zone for applying paint to the outer surface of the ring member as the said member is rotated through said zone.

In testimony whereof, we have hereunto subscribed our names at Eau Claire, county of Eau Claire, Wisconsin.

ARNOLD R. KRAUSE.
ALFRED C. HIRSCH.